Figure 1A:
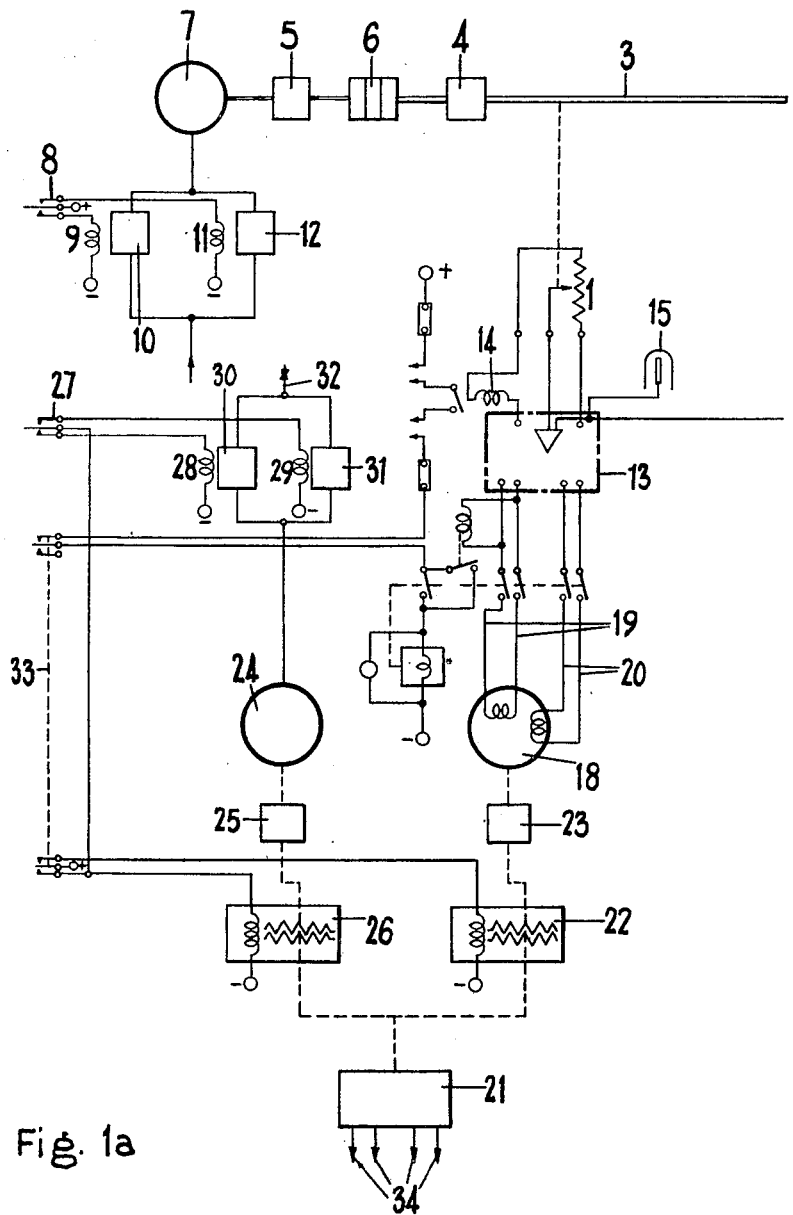

Sept. 25, 1962   R. J. SMITH   3,055,820
THERMAL REACTORS

Filed Sept. 25, 1957   5 Sheets-Sheet 2

INVENTOR
Roy Jackson Smith
BY
ATTORNEYS

Sept. 25, 1962 R. J. SMITH 3,055,820
THERMAL REACTORS
Filed Sept. 25, 1957 5 Sheets-Sheet 3

INVENTOR
Roy Jackson Smith
BY
ATTORNEYS

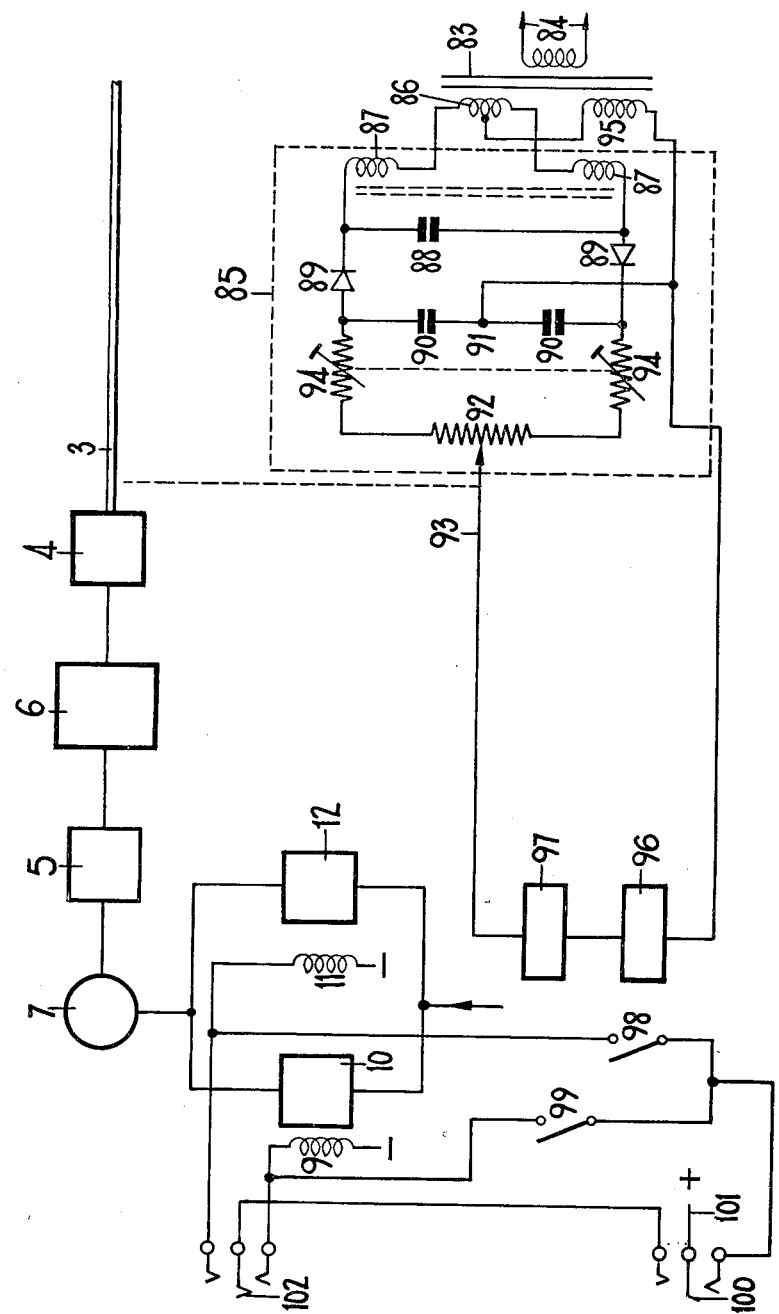

United States Patent Office 3,055,820
Patented Sept. 25, 1962

3,055,820
THERMAL REACTORS
Roy Jackson Smith, Orpington, England, assignor to The General Electric Company Limited, London, England
Filed Sept. 25, 1957, Ser. No. 686,202
Claims priority, application Great Britain Oct. 1, 1956
8 Claims. (Cl. 204—193.2)

This invention relates to nuclear reactors, and particularly to nuclear reactors having a core in which heat is arranged to be generated by nuclear fission, the said core being provided with ducts or channels for the flow of fluid cooling medium which is arranged to abstract heat from the core.

Such nuclear reactors may, for example, be employed in nuclear power stations. Fluid cooling medium such as carbon dioxide under pressure, after abstracting heat from the reactor core, may be arranged to be conducted to one or more steam raising units where heat given up by the fluid medium is used to generate steam for use in turbo-alternator plant. Particularly for applications of this kind, it may be desirable to adjust the power output from the nuclear reactor in an automatic or semi-automatic fashion over a range of levels, and it is an object of the present invention to provide control means whereby this may be done in a manner which is both safe and simple to operate.

According to the present invention, in a nuclear reactor having a core in which heat is arranged to be generated by nuclear fission, the said core being provided with ducts or channels for the flow of fluid cooling medium which is arranged to abstract heat from the core, control means are provided for maintaining a predetermined relationship between the neutron flux within the core and the flow of cooling medium such that the temperatures within the core, and particularly in the cooling medium circuit, remain substantially constant or subject to only small variation over a range of power levels of the nuclear reactor.

Maintenance of constant temperature over a range of power levels means that the reactor is subjected to a minimum of thermal shock and thus ensures maximum safety of operation. The predetermined relationship may simply be that of a constant ratio between the neutron flux and cooling medium flow. Alternatively, in order that the temperatures may remain more accurately constant when the power level is changed, the ratio may be maintained at a series of closely similar predetermined values rather than a single such value.

Although it would be possible to employ only one independent control circuit, for example for the neutron flux, and have the medium flow made dependent upon this according to the predetermined relationship, it is preferred to employ an arrangement in which there are two separate closed loop automatic control circuits for these two parameters because of the better inherent stability obtained thereby. The control means for maintaining a predetermined relationship between the two parameters may then comprise ganged potentiometers, one potentiometer being attached to each closed loop circuit and the arrangement being such that each parameter is adjusted by the corresponding circuit to a value determined by the setting of the potentiometer attached to that circuit.

In employing such a nuclear reactor in a nuclear power station, it may be desirable to extend the automatic control a stage further. Thus, the control means may themselves be controlled either in dependence upon the steam pressure in the turbine section of turbo-alternator plant, or in dependence upon the electrical output. In this latter case, which is particularly desirable for a nuclear power station providing electricity for the National Grid, the power station may respond to the demand made upon it in a way which is fully automatic, the power output of the nuclear reactor being adjusted to correspond to the demand made upon the power station within the limits imposed by the capacity of the station.

Figure 1B:
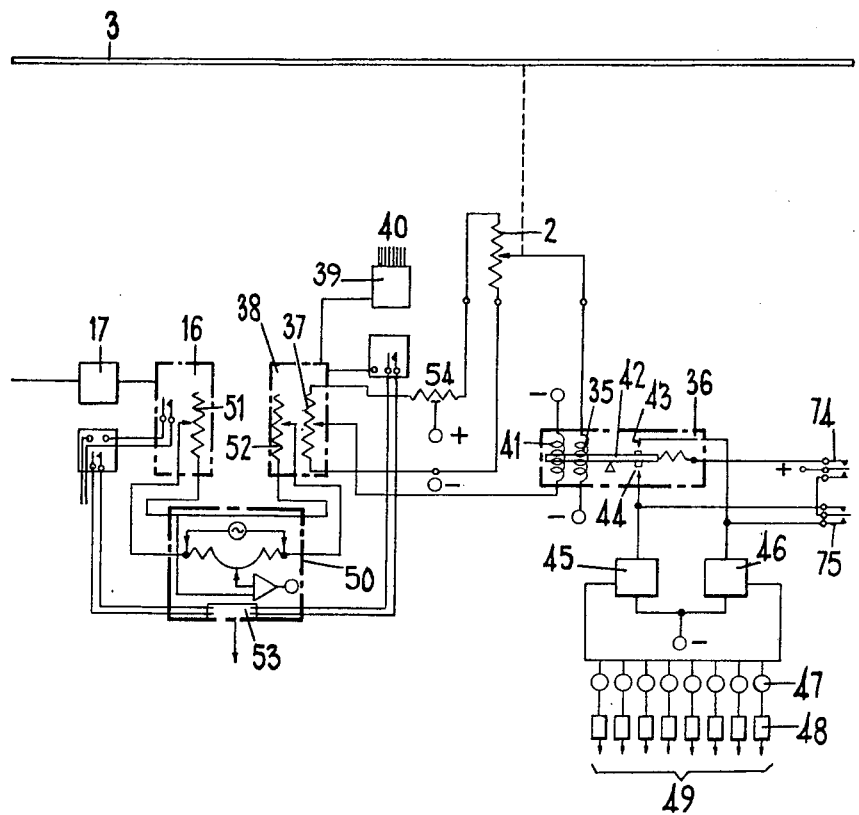
Figure 1C:
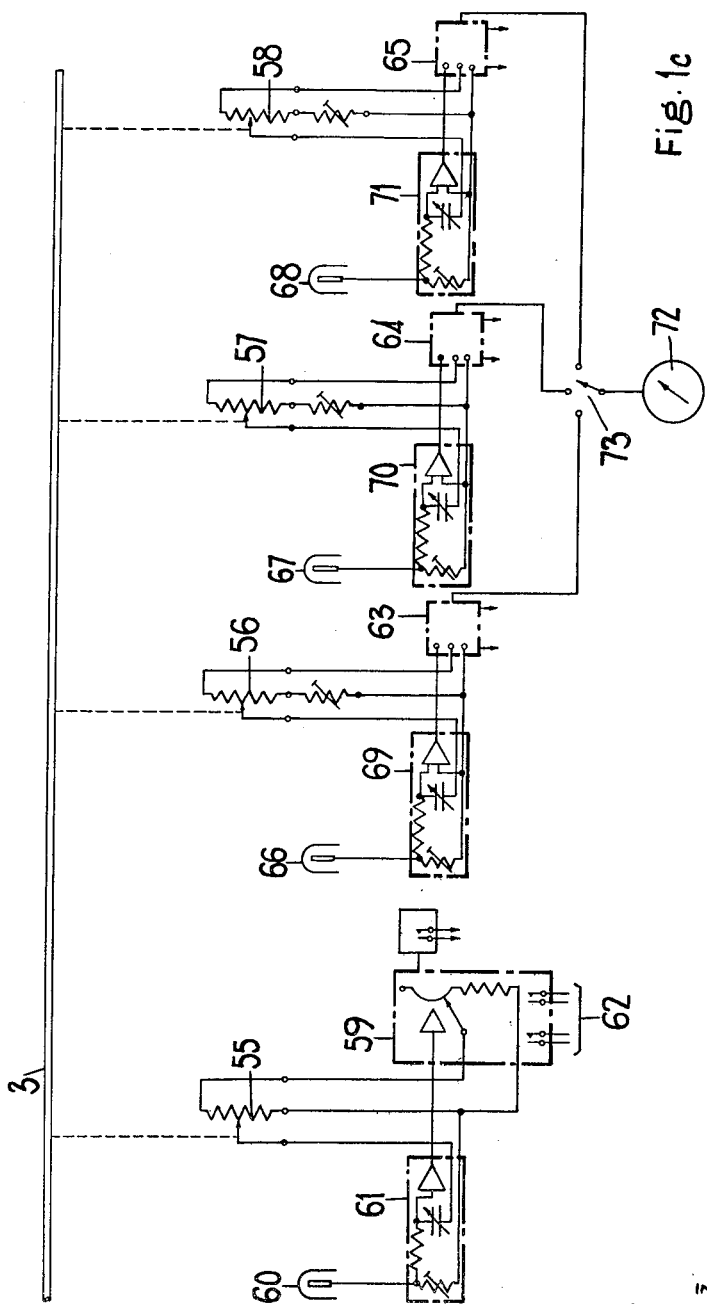
Figure 2:
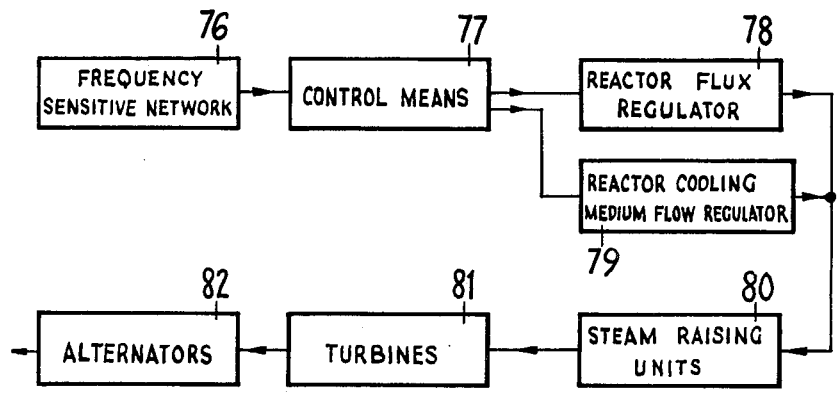
Figure 4:
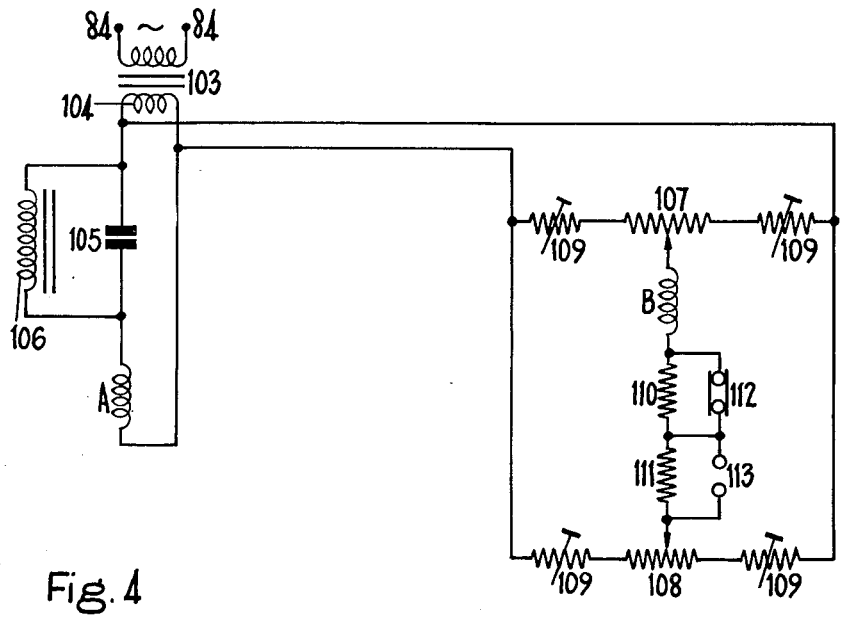

A nuclear reactor, and a nuclear power station including such a reactor, will now be described by way of example with reference to the four figures of the accompanying drawings in which:

FIGURE 1, which is split into FIGURES 1a, 1b and 1c for convenience, shows a circuit diagram of apparatus for the control of the nuclear reactor, FIGURE 2 shows a block diagram of an extension of the control system for use in a nuclear power station, FIGURE 3 shows a circuit diagram of a frequency sensitive network and associated apparatus for use in the extended control system of FIGURE 2, and FIGURE 4 shows an alternative frequency sensitive network.

Referring now to FIGURE 1, potentiometers 1 and 2 are ganged through a shaft 3 operated through gear boxes 4 and 5 and a power register 6 from a three phase motor 7. Forward and reverse control of the motor 7 is effected through a lever key 8 which may be moved so as to energise either the operating coil 9 of a contactor 10 arranged to drive the motor in a forward direction, or so as to energise the operating coil 11 of a contactor 12 arranged to drive the motor in the reverse direction. The motor 7 has a limited maximum speed, such that the maximum rate of change of power level which may be effected per minute through its agency is limited to 5% of the full value. The power register 6 and lever key 8 are situated in a prominent position near the reactor operator, and the ganged potentiometers 1 and 2 operated in this way constitute the control means for maintaining a predetermined relationship between the neutron flux within the reactor and the flow of cooling medium. The manner in which the ganged potentiometers 1 and 2 effect this control will now be described.

The setting of the potentiometer 1 determines the value of neutron flux which is desired within the reactor, that is to say, if the value of neutron flux is to be altered it is necessary to drive this potentiometer through the three phase motor 7 to the required value, the potentiometer 2 being altered accordingly through the ganging shaft 3. The neutron flux is then adjusted to correspond with the new setting of the potentiometer 1 by a closed loop circuit, termed the automatic flux regulator and indicated generally at 13. An amplifier included in the automatic flux regulator 13 provides a stable voltage for the attached potentiometer 1, and an earth continuity relay 14, which opens the final output contactors in the event of supply failure or a cable breakage, is also incorporated. The input to the automatic flux regulator 13 is derived from an ion chamber 15 which is situated near the reactor core and measures the neutron flux. The ion chamber 15 also feeds a linear power recorder 16 through an amplifier 17.

Within the flux regulator 13, the input from the ion chamber 15 is compared with the setting of the desired flux potentiometer 1. The error signal obtained thereby is passed through an amplifier comprising electronic followed by magnetic stages and incorporating phase advance stabilising networks. The output from the flux regulator 13 is taken to a motor 18 operating from a 400 cycles per second two phase supply derived from the magnetic amplifier stages. This supply is two phase, and while the control phase 19 is derived from a push-pull magnetic amplifier, the reference phase 20 is drawn from a unidirectional amplifier to avoid excessive current being drawn when the motor is stationary. This arrangement also is advantageous in that it maintains the correct 90° phase difference between the phase windings 19 and 20. As an alternative, the error signal could be applied to a pair of polarised relays controlling the supply to the motor 18.

The motor 18 is arranged to drive an induction regulator contained in a low frequency generator 21 through a clutch 22 and gearing 23. Alternative hand control is also provided, there being a hand motor 24 which is a three phase 50 cycle per second unit and operates in a similar way to the motor 18 through gearing 25 and clutch 26 to drive the induction regulator contained at 21. A second lever key 27 is arranged to act through operating coils 28, 29 on alternative contactors 30, 31 in the supply 32 to the motor 24 in a way analogous to that already described in the case of the lever key 8 operating the potentiometer ganging shaft 3. The choice of automatic or hand operation is made through a switch 33 whose upward movement causes the clutch 22 of the automatic circuit to be included together with the circuit for the earth continuity relay 14 and contactors for the motor 18, while its downward movement brings in the clutch 26 corresponding to hand operation.

The induction generator contained at 21 serves to alter the frequency of a low frequency generating circuit which in turn controls a winch for adjusting the extent to which control rods indicated generally at 34 are inserted into or raised out of the reactor core. These control rods are of neutron absorbing material and their movement is arranged to vary the neutron flux within the reactor.

There is a second and quite separate closed loop circuit for the circulation of the fluid medium, attached to the potentiometer 2. Turning now to this second control circuit, a signal dependent upon the setting of the "desired medium flow" potentiometer 2 is fed to one coil 35 of a different relay 36, which may alternatively be two polarised relays having their contacts connected differentially. A further signal representing the actual cooling medium flow is derived from a slide wire 37 acting as a slave in a total medium flow recorder 38 fed from means 39 arranged to sum the output from flow measuring devices 40 attached to the medium circulators. This signal from the slave slide wire 37 is passed through a further coil 41, similar to the coil 35, in the relay 36. Any difference in the forces produced by the coils 35, 41 causes the beam 42 of the relay 36 to move and close one of the two contacts 43, 44. These contacts 43, 44 operate either of a pair of relays 45, 46 normally arranged to be situated in the control desk of the reactor operator. The relays 45, 46 drive phase shifters 47, which are ganged together and connected to grid control rectifiers 48 controlling the supply to medium circulators 49 and thus governing the speed. One relay 45 acts so as to advance the phase while the relay 46 operates to retard it. Adjustment of the dead-band of the system is effected by shunting the relay coils 35, 41. In addition to the ganged automatic operation of the phase shifters 47 already described, these phase shifters may be adjusted as a group by a manual control on the reactor operator's desk or they may be operated individually from reactor panel controls.

A flux/flow recorder 50 is included to check the effective operation of the control means. It takes the form of a resistance bridge having inputs derived from a slave slide wire 51 in the linear power recorder 16 and a similar wire 52 in the total cooling medium flow recorder 38. The scale on the flux/flow recorder 50 is symmetrical about full power correct value, the units in which it is calibrated being arbitrary. Circuits indicated generally at 53 are also included for operating an alarm or subsequently tripping the reactor in the case of excessive flux/flow ratio.

To summarise, two separate closed loop automatic control circuits are provided, one for the stabilisation of neutron flux and therefore reactor power, the other for the stabilisation of flow of cooling medium. The two circuits are essentially independent but are combined to the extent that settings of the desired neutron flux and coolant flow through the potentiometers 1 and 2 respectively are coupled through the ganging shaft 3 to form a single control means operated ultimately from the lever key 8. Control is motorised, and the maximum speed of the motor is such that the change in reactor power effected by change of flux or flow is much slower than the response time of either control circuit. While the circuit here described is designed to operate over the range 25% to 100% full reactor power, wider range coverage may be possible if needed.

The ganged potentiometers 1 and 2 which comprise the overall control means will normally be linear, so that the predetermined relationship which is maintained between neutron flux and cooling medium flow takes the simple form of a constant ratio between these two parameters. This constant ratio is subject to manual trim through a trimming control 54 included in the circuit for regulation of medium flow; the control 54 acts so as to alter the value of the desired medium flow setting on the potentiometer 2 with respect to the flux potentiometer 1.

Maintenance of a fixed ratio of flux to flow results in only small temperature variations in the ducts or channels forming the cooling medium circuit within the reactor core when the power level of the nuclear reactor is varied over the range specified. The reactor operator is provided with a simple check on the performance of the control means through the flux/flow recorder 50, which is of course invaluable if manual control is substituted for automatic control. In order to keep temperatures more accurately constant it is possible, however, to arrange that the ratio of the two parameters is maintained at a series of closely similar predetermined values corresponding to different reactor power levels rather than a single such predetermined value. This may conveniently be effected by making at least one of the potentiometers 1, 2 non-linear.

The ganging shaft 3 is also extended to operate four further ganged precision potentiometers 55, 56, 57, 58 operating safety, recording and alarm gear. The potentiometer 55 is associated with a power drift recorder 59 from which it also derives its supply. The reactor flux is measured by an ion chamber 60 similar to 15, passes through a head amplifier 61 and is compared in the power drift recorder 59 with a centre setting of the desired neutron flux represented by the signal from the ganged potentiometer 55. If the power, as represented by the measured neutron flux, drifts too far from the centre setting, alarm circuits represented generally at 62 are arranged to be operated by contacts on a range, which may for example be ±2%, provided in the indicating part of the recorder 59. This recorder 59 thus serves as an indication to the reactor operator of the correct functioning of the whole automatic control system. The remaining three potentiometers 56, 57, 58 adjust the trip level setting of corresponding shut-down amplifiers 63, 64, 65. These operate in a similar way to the power drift arrangement, being fed with signals from ion chamber flux measurers 66, 67, 68 through amplifiers 69, 70, 71. In this case, however, when the discrepancy between the measured flux and the trip level setting as derived from the setting of each potentiometer is sufficiently great, an alarm is sounded and trip circuits are arranged to shut down the reactor. A trip margin indicator 72 may be connected through a selector switch 73 to any one of the shut-down amplifiers 63, 64, 65. The purpose of the provision of three such amplifiers is to ensure that the reactor does not shut down unnecessarily; the circuits may be arranged so that shut down is only effected if two of the amplifiers indicate a flux discrepancy which is too great. Thus, if each pair out of three pairs of contacts $A_1A_2$, $B_1B_2$, $C_1C_2$ is operated from the output of a different amplifier, an arrangement in which $A_1$ and $B_2$, $B_1$ and $C_2$, $C_1$ and $A_2$ are connected in parallel pairs and these three pairs connected in series through the alarm and trip circuits to a supply would be suitable.

A complete manual over-ride is provided for the two closed loop automatic control circuits for the neutron flux and coolant medium flow respectively. In the case of the neutron flux circuit, this manual over-ride is effected by movement of the switch 33 in a direction which is downward in the diagram, followed by operation of the hand lever key 27. For the coolant flow circuit, movement of a switch 74 in an upward direction gives automatic control, while movement downward of this switch brings into circuit a hand lever key 75 whose movement is arranged to operate either of the relays 45, 46. Automatic control, on the other hand, is not solely dependent upon movement of the switches 33, 74 in an upward direction followed by operation of the lever key 8 if any change in the power level is required. The desired power setting on the register 6 must first be within 1% of the reactor power; the linear power recorder 16 must be on the correct range and may be required to show a reading corresponding to more than a certain power level if it is not thought desirable to transfer to automatic control below, say, 25% full power; the drift power recorder 59 must also be on the correct range. Additional safety measures ensure that automatic control cannot be initiated unless the power supplies to the automatic equipment, including the desired flux setting potentiometer 1, are live, and also the safety control rods, which are only lowered into the reactor core in case of emergency, are fully withdrawn.

An automatic control arrangement such as that described above has several advantages. The ganged potentiometer control means greatly reduces the skill required of the reactor operator, since changes of power output level may be effected simply and with safety. If required, pre-set decreases in neutron flux and cooling medium flow may be made as an alternative to complete tripping of the reactor. The neutron flux control circuit avoids unnecessary shut-down of the reactor during "on load" servicing, when significant change of reactivity may occur, more particularly when fuel elements are charged or discharged. If a single cooling medium circulator fails at full or partial load, the total flow of medium is maintained by the medium flow control circuit until the reactor operator reduces the power to the appropriate new level; manual speed control of each circulator is also possible by an operator in the central control room so that compensation for different characteristics of individual circulators may be effected if required.

It has previously been explained that the present invention is of particular importance in connection with nuclear power stations. In such a power station the fluid cooling medium, after abstracting heat from the reactor core, is arranged to be conducted to one or more steam raising units where heat given up by the fluid cooling medium is used to generate steam for use in turbo-alternator plant. It would be perfectly possible to use the control apparatus shown in FIGURE 1 in a nuclear power station without further modification, a power station operator effecting any desired change in power level by operation of the lever key 8 situated in a desk in the central control room of the station. However, a further extension of the control system for use in a nuclear power station may be desired so that the operation of the station is largely or wholly automatic.

Thus, in conventional coal-fired steam driven power stations, a speed governor is associated with the turbine section of the turbo-alternator plant. As the turbine speed falls, the turbine governors are arranged to open inlet valves so as to admit more steam and so help to meet the demand made upon the station. Such an arrangement may be used in a nuclear power station, and a signal obtained from the resultant variation in steam pressure may be used to automatically control the control means previously described. For example, referring to FIGURE 1, the lever key 8 would then be replaced by an arrangement allowing the signal to operate the motor 7. The pressure at a low pressure steam receiver may be compared with a desired pressure, and a signal representing the error or difference may be fed into a three-term controller whose output drives the motor 7 in a direction such as to reduce the error.

An alternative and more fully automatic arrangement is illustrated in FIGURE 2. In this arrangement, the control means are themselves automatically controlled by a signal dependent upon the electrical output of the turbo-alternator plant so that the power output of the reactor is adjusted to correspond to the demand made upon the power station within the limits imposed by the capacity of the station. Thus, the frequency of the electrical output affects a frequency sensitive network 76, replacing the lever key 8, and an error signal is generated which regulates the means 77, controlling the reactor flux regulator 78 and the cooling medium flow regulator 79 as before, these in turn determining the condition of the cooling medium as it flows to the steam raising units 80. Steam raised at 80 then flows to turbines 81 and alternators 82, the output from the alternators 82 affecting the frequency sensitive network 76 so that a complete cycle is established. A fall in the frequency of the electrical output gives rise to an increase in the power level of the nuclear reactor and vice versa.

FIGURE 3 shows an example of such an extended control system of a type which could be used with the control apparatus shown in FIGURE 1. Referring now to FIGURE 3, a transformer 83 has a primary winding supplied from the electrical output 84 of the turbo-alternator plant. The transformer 83 has a double wound secondary winding supplying a frequency sensitive network indicated generally at 85. One section 86 of the secondary winding of transformer 83 is centre-tapped, and connected in series to chokes 87 across which is connected a capacitor 88. Rectifiers 89 run from opposite sides of the capacitor 88 to further series-connected capacitors 90 having a centre point 91. Across the capacitors 90 are connected in series a potentiometer 92 which is ganged to the shaft 3 so that the setting of its tapping point 93 represents a set nuclear reactor power level, and a further arrangement of two coupled variable resistances 94 set by the station operator. The other section 95 of the transformer 83 is connected at one end to the centre tapping of the section 86, while the other end runs both to the centre point 91 of the capacitors 90 and to polarised relays 96, 97 which are series-connected to the potentiometer tapping point 93.

At one set frequency, which may be adjusted by altering the setting of the variable resistances 94, the voltage at the centre point 91 of the capaictors 90 will be equal to the voltage at the tapping point 93 on the potentiometer 92. As the frequency of the electrical output 84 of the turbo-alternator plant varies, this balance will be disturbed so that an error signal in the form of an electric current flowing through the polarised relays 96, 97 will be generated. These relays 96, 97 operate contacts 98, 99. A change-over switch 100 has a lever key 101 which, when moved in a downward direction, puts the motor 7 under the control of the frequency sensitive network 85 through the contactors 10, 12 having operating coils 9, 11 now arranged to be energised by closure of the contacts 98, 99. Thus, if the frequency of the electrical output 84 increases, an error signal is generated which causes the polarised relay 96 to operate its contact 98. This in turn energises the operating coil 11 of the contactor 12 arranged to drive the motor 7 in the reverse direction, so that the power level is reduced to a value at which the difference in voltages between the potentiometer tapping point 93 and the centre point 91 of the capacitors 90 is negligible. When the lever key 101 of the change-over switch 100 is moved in an upward direction, the control means are returned to manual operation through a lever key 102 similar to the key 8 in FIGURE 1.

It is known that the frequency of the electrical output 84 of a power station is subject to frequent and rapid small changes in addition to long term drifts. It is not necessary that the control arrangement should respond to minor instantaneous variations in frequency, and indeed such variations may produce considerable wear and tear of the equipment. The arrangement shown in FIGURE 3 would be sensitive to such variations in addition to the relatively long term changes in frequency which it is designed to detect, and from this point of view it may be desirable to modify the type of frequency sensitive network employed. One possible modification is shown in FIGURE 4.

Referring now mainly to FIGURE 4, the electrical output 84 is again applied to the primary winding of a transformer, the transformer 103 in this case having a single secondary winding 104 across which are connected two parallel circuits. The first circuit comprises a parallel tuned arrangement including a capacitor 105 and an inductance 106, connected in series with one coil A of a double magnet eddy current disc type relay (not shown). The second circuit connected in parallel across the secondary winding 104 comprises two potentiometers 107, 108 connected in parallel through ballast resistances 109 for adjustment purposes. The potentiometer 108 is set by the station operator, the setting representing one particular power output at a given fixed frequency, e.g. full load output at 50 cycles. The potentiometer 107 is ganged to the other potentiometers on the shaft 3 in a similar way to the potentiometer 92 in FIGURE 3, so that its setting provides an indication of the power level of the nuclear reactor. When the electrical output 84 corresponds to the above-mentioned fixed frequency, the setting of the potentiometers 107, 108 will be identical. At any other frequency, the difference between the settings of the potentiometers 107, 108 is a direct function of the extent to which the frequency of the electrical output differs from the fixed frequency.

A second coil B of the eddy current disc type relay is connected through impedances 110, 111 between the tapping points of the potentiometers 107, 108. In further detail, the relay comprises a riveted disc of metal capable of movement between the air-gaps of two horseshoe-shaped electro-magnets wound respectively with the coils A and B and having their faces equipped with shading bands. Under balanced conditions the two magnets tend to rotate the disc in opposite directions and a contact arm attached to the disc rides in a central position. If the excitation of either coil A or coil B is reduced, the contact arm rotates with the disc into either of two extreme positions, where it is arranged to close contacts which operate the control means. Thus, the contacts preferably close the circuits of repeat relays which carry out the same functions as the polarised relays 96 and 97 in FIGURE 3. These repeat relays are also provided with contacts 112, 113 shunted across the impedances 110, 111 so that, upon closure of the contacts of the main disc type relay, a sufficient increase in the hysteresis of the relay setting current is effected to ensure that the contacts stay closed until a definite change in the setting of the unit has been made. This ensures that the main relay contact arm does not vibrate about one or other of its ends of traverse.

The movement of the eddy current disc of the relay is controlled by means of a tension spring so that the disc does not drift or rotate for very small errors of insignificant magnitude. Any oscillations in the disc movement due to small instantaneous variations in output frequency can be further reduced by arranging that the eddy current disc passes between the poles of a horseshoe-shaped permanent magnet. Again, by ensuring that the contact arm has to rotate a significant amount before it reaches either extreme position and closes the corresponding contacts, it is possible to ensure that such closure is not effected in response to minor changes in the frequency of the electrical output from the turbo-alternator.

I claim:

1. In a nuclear reactor wherein heat generated in the reactor core by nuclear fission is abstracted from the core by circulating cooling medium, a control arrangement for maintaining the temperature within the core substantially constant over a range of power levels of the reactor comprising, in combination, means for variably setting up a first reference signal; means for variably setting up a second reference signal; means for mutually interrelating and maintaining said first and second reference signals in a predetermined relationship with one another; a first closed loop control circuit for controlling the neutron flux within the core to a value determined by said first reference signal, said first circuit including control means for adjusting the neutron flux, means responsive to the neutron flux for producing a flux-dependent signal, and means for comparing said flux-dependent signal with said first reference signal and actuating said control means in accordance with the comparison so as to reduce any discrepancy between these signals; and a second closed loop control circuit for controlling the flow of cooling medium to a rate determined by said second reference signal, said second circuit including cooling medium circulating means, means responsive to the cooling medium flow for producing a flow-dependent signal, and means for comparing said flow-dependent signal with said second reference signal and controlling said circulating means in accordance with the comparison so as to reduce any discrepancy between these signals.

2. A control arrangement as set forth in claim 1 wherein a manually operated trimming control is included in one of the closed loop control circuits for adjusting the predetermined relationship between the first and the second reference signals.

3. A control arrangement as set forth in claim 1 wherein two manual overrides are included, a different one in each of the closed loop control circuits.

4. In a nuclear reactor wherein heat generated in the reactor core by nuclear fission is abstracted from the core by circulating cooling medium, a control arrangement for maintaining the temperature within the core substantially constant over a range of power levels of the reactor comprising, in combination, a first closed loop control circuit for controlling the neutron flux within the core to a value determined by a first reference signal, said first circuit including a potentiometer for producing the first reference signal, control means for adjusting the neutron flux, means responsive to the neutron flux for producing a flux-dependent signal, and means for comparing said flux-dependent signal with said first reference signal and actuating said control means in accordance with the comparison so as to reduce any discrepancy between these signals; a second closed loop control circuit for controlling the flow of cooling medium to a rate determined by a second reference signal, said second circuit including a potentiometer for producing the second reference signal, cooling medium circulating means, means responsive to the cooling medium flow for producing a flow-dependent signal, and means for comparing said flow-dependent signal with said second reference signal and controlling said circulating means in accordance with the comparison so as to reduce any discrepancy between these signals; and means for setting said potentiometers constituted by a ganging shaft common to both potentiometers and an electric motor for rotating said shaft.

5. A control arrangement as claimed in claim 4 wherein said potentiometers are linear.

6. A control arrangement as claimed in claim 4 wherein at least one of said potentiometers is non-linear.

7. In a control arrangement as claimed in claim 4, an emergency control circuit comprising a further potentiometer for producing a third reference signal, said further potentiometer being coupled to said ganging shaft, further means responsive to the neutron flux for producing a further flux-dependent signal, means for comparing said further flux-dependent signal with said third reference signal, and means operable in accordance with the comparison for producing an emergency control signal in the event that the discrepancy between said flux-dependent signal and said third reference signal exceeds a predetermined amount.

8. In a nuclear power station of the kind in which heat generated in the core of a nuclear reactor is abstracted from the core by circulating cooling medium and utilized in steam raising plant to produce steam for driving turboalternators having speed governors, a control arrangement for maintaining the temperature within the core substantially constant over a range of power levels of the reactor comprising, in combination, a first closed loop control circuit for controlling the neutron flux within the core to a value determined by a first reference signal, said first circuit including a potentiometer for producing the first reference signal, control means for adjusting the neutron flux, means responsive to the neutron flux for producing a flux-dependent signal, and means for comparing said flux-dependent signal with said first reference signal and actuating said control means in accordance with the comparison so as to reduce any discrepancy between these signals; a second closed loop control circuit for controlling the flow of cooling medium to a rate determined by a second reference signal, said second circuit including a potentiometer for producing the second reference signal, cooling medium circulating means, means responsive to the cooling medium flow for producing a flow-dependent signal, and means for comparing said flow-dependent signal with said second reference signal and controlling said circulating means in accordance with the comparison so as to reduce any discrepancy between these signals; means for setting said potentiometers constituted by a common ganging shaft and a reversible electric motor for rotating said shaft, means for deriving an error signal in dependence upon any deviation of the frequency of the electrical output of said turboalternators from a reference frequency, and contactor means for connecting said motor for forward or reverse driving in dependence upon said error signal.

References Cited in the file of this patent

Nucleonics, vol. 11 (June 1953), pages 53–55.
Nucleonics, vol. 12 (February 1954), page 12.
Boch: AECU–3170, USAEC report (1955), front cover and pages 15–17.
IRE Trans. on Nuclear Science, vol. NS–1, No. 1 (September 1954), pages 8–11, article by Stubbs.
Schultz: Control of Nuclear Reactors and Power Plants, McGraw-Hill Book Co., Inc., New York, 1955, pp. 130, 62, 64, and 275.
Hall: NAA-SR-Memo-1639, USAEC report (May 21, 1956), front cover and pages 16–18.
IRE National Convention (1956), paper by Parsegian presented at New York, N.Y., March 1956, pages 83–89.
Nuclear Power, vol. 2 (February 1957), pages 46–47.